(12) United States Patent
Ni et al.

(10) Patent No.: US 7,009,369 B2
(45) Date of Patent: Mar. 7, 2006

(54) ADVANCED MONITORING ALGORITHM FOR REGULATED POWER SYSTEMS WITH SINGLE OUTPUT FLAG

(75) Inventors: Chuan Ni, Kingston, RI (US); Christopher J. Sanzo, Providence, RI (US); Todd M. Sherman, Hope Valley, RI (US)

(73) Assignee: Texas Instruments Incorporated, Dallas, TX (US)

( * ) Notice: Subject to any disclaimer, the term of this patent is extended or adjusted under 35 U.S.C. 154(b) by 217 days.

(21) Appl. No.: 10/748,848

(22) Filed: Dec. 30, 2003

(65) Prior Publication Data

US 2005/0012491 A1  Jan. 20, 2005

Related U.S. Application Data

(60) Provisional application No. 60/486,975, filed on Jul. 14, 2003, provisional application No. 60/490,092, filed on Jul. 25, 2003.

(51) Int. Cl.
*G05F 1/577* (2006.01)

(52) U.S. Cl. ............... 323/267; 323/901; 363/49
(58) Field of Classification Search ............... 323/267, 323/272, 901; 363/49, 65
See application file for complete search history.

(56) References Cited

U.S. PATENT DOCUMENTS

| | | | | |
|---|---|---|---|---|
| 4,359,679 A | * | 11/1982 | Regan | 323/272 |
| 5,019,717 A | * | 5/1991 | McCurry et al. | 307/66 |
| 5,610,503 A | | 3/1997 | Fogg et al. | 323/283 |
| 5,808,453 A | * | 9/1998 | Lee et al. | 323/224 |
| 6,150,803 A | * | 11/2000 | Varga | 323/282 |
| 6,204,706 B1 | | 3/2001 | Horvath | 327/198 |
| 6,346,798 B1 | * | 2/2002 | Passoni et al. | 323/272 |
| 6,418,002 B1 | | 7/2002 | Yang et al. | 361/90 |
| 6,430,070 B1 | | 8/2002 | Shi et al. | 363/97 |
| 6,465,993 B1 | * | 10/2002 | Clarkin et al. | 323/272 |
| 6,480,367 B1 | * | 11/2002 | Shi et al. | 361/18 |
| 6,583,520 B1 | | 6/2003 | Shi et al. | 307/33 |
| 6,593,724 B1 | * | 7/2003 | Chen | 323/283 |
| 6,738,268 B1 | * | 5/2004 | Sullivan et al. | 363/49 |

OTHER PUBLICATIONS

Dual, Voltage Mode, DDR Selectable, Synchronous, Step-Down Controller For Notebook System Power, Texas Instruments, Jul. 2003.

* cited by examiner

*Primary Examiner*—Jeffrey Sterrett
(74) *Attorney, Agent, or Firm*—W. Daniel Swayze, Jr.; W. James Brady; Frederick J. Telecky, Jr.

(57) ABSTRACT

An improved method of monitoring the output power provided by a switch mode power converter that reduces the overall cost of the converter. The method includes initiating a soft-start procedure for a first output voltage in the event the first voltage channel is enabled. When the first voltage level comes within regulation, a delay counter counts a predetermined number of clock cycles. In the event a second output voltage channel is enabled between the time the first channel is enabled and the time the first voltage comes within regulation, a soft-start procedure is initiated for the second voltage and the delay counter re-starts when the second voltage comes within regulation. After the delay counter finishes counting, the first and second voltages are considered stable and a single Power-Good signal is asserted. In the event one of the channels is disabled by a user while the other channel remains enabled, the disabled channel is ignored and the PGOOD signal stays asserted to indicate that the power provided by the converter on the enabled channel is good.

8 Claims, 3 Drawing Sheets

ADVANCED MONITORING ALGORITHM FOR REGULATED POWER SYSTEMS WITH SINGLE OUTPUT FLAG

CROSS REFERENCE TO RELATED APPLICATIONS

This application claims priority under 35 USC § 119 of provisional application Ser. No. 60/486,975, filed Jul. 14, 2003 and provisional application Ser. No. 60/490,092, filed Jul. 25, 2003.

STATEMENT REGARDING FEDERALLY SPONSORED RESEARCH OR DEVELOPMENT

N/A

BACKGROUND OF THE INVENTION

The present application relates generally to switch mode power supplies, and more specifically to switch mode power converters capable of generating Power-Good signals indicative of whether power corresponding to one or more output voltage channels of the converter is within a predetermined acceptable range.

In recent years, the need for switch mode power supplies or DC-to-DC converters has risen dramatically as Integrated Circuits (ICs) such as Digital Signal Processors (DSPs) and mixed signal ICs have continued to decrease in size while their power consumption has increased. Switch mode power converters are typically employed in such ICs for converting positive or negative input supply voltages to output supply voltage levels that are appropriate for powering circuitry within the IC and/or for powering circuitry externally connected to the IC. For example, a switch mode power converter may be configured for either increasing or decreasing an input supply voltage level provided to an IC.

Conventional switch mode power converters typically generate at least one Power-Good (PGOOD) signal for reporting whether power corresponding to at least one output voltage channel is "good", i.e., within a predetermined acceptable range. For example, in the event the output voltage level is below a predetermined upper limit (e.g., about 110% of a required output voltage level) and above a predetermined lower limit (e.g., about 90% of the required output voltage level), the PGOOD signal may be asserted high by the converter, indicating that the power provided on the output channel is within the predetermined acceptable range. Further, in the event the output voltage level falls outside the predetermined voltage range, the PGOOD signal may be asserted low by the converter, indicating that the power provided on the output channel is no longer good. It is noted that output current information may be monitored instead of or in addition to the output voltage information, and that the PGOOD signal may be used to report the power condition of the converter based on the output current information. Accordingly, by monitoring the state of one or more PGOOD signals generated by the switch mode power converter, users can readily determine whether output voltage levels and/or output current levels generated by the converter fall within predetermined acceptable ranges.

Although the above-described approach to monitoring output power levels of switch mode power converters has been successfully employed to monitor output power associated with a single channel within a converter, this approach frequently has drawbacks when used to monitor the output power associated with multiple converter channels. For example, to monitor the power associated with more than one channel within a switch mode power converter, a power-good circuit operative as described above may be provided for each converter channel. Further, PGOOD signals indicative of the power condition corresponding to the multiple converter channels may be provided at respective output pins of the converter.

However, using a separate PGOOD circuit for each channel within a switch mode power converter can consume a significant amount of the circuit area available within the converter. For example, a switch mode power converter is typically implemented on an IC chip. Further, because multiple PGOOD circuits employed within the converter may increase the amount of circuit area required on the IC chip, semiconductor die sizes may have to be increased to accommodate the increased circuit area, thereby increasing the overall cost of the converter. Moreover, providing PGOOD signals on multiple outputs of the converter may increase the number of pins on the IC package, further increasing the cost of the converter.

In addition, conventional approaches to monitoring output power levels of switch mode power converters, whether they provide PGOOD signals on single or multiple outputs, have typically required a substantial amount of external logic to implement practical power monitoring schemes, thereby increasing both the complexity and the cost of the converters.

It would therefore be desirable to have an improved method of monitoring output power provided by switch mode power converters that avoids the drawbacks of the above-described conventional output power monitoring techniques.

BRIEF SUMMARY OF THE INVENTION

In accordance with the present invention, an improved method of monitoring the output power provided by a switch mode power converter is disclosed that reduces the overall cost of the converter. Benefits of the presently disclosed output power monitoring technique are achieved by reducing both the number of Power-Good signals generated by the converter and the amount of circuit area required within the converter.

In one embodiment, the method of monitoring the output power provided by a switch mode power converter includes initiating a soft-start procedure for at least one first output voltage in the event the first output voltage channel is enabled. Next, in the event the first output voltage level comes within regulation, a delay counter counts a predetermined number of clock cycles. After the delay counter has counted the predetermined number of clock cycles, the first output voltage is considered stable and a Power-Good (PGOOD) signal is asserted to indicate that the power provided by the converter on the first channel is "good". Alternatively, in the event at least one second output voltage channel is enabled between the time the first channel is enabled and the time when the first output voltage comes within regulation, a soft-start procedure is initiated for the second output voltage. Next, in the event the second output voltage level comes within regulation, the delay counter re-starts its counting of the predetermined number of clock cycles. After the delay counter has counted the predetermined number of clock cycles, the first and second output voltages are considered stable and the Power-Good (PGOOD) signal is asserted to indicate that the power provided by the converter on the first and second channels is good. Alternatively, in the event the second output voltage channel is enabled after the first output voltage level comes within regulation, the enabling of the second channel is ignored until after the second voltage output finishes its soft-start procedure. In the event either the first or second output voltage falls out of regulation, or in the event an input under-voltage lock-out condition is detected while at least one output channel is enabled, the PGOOD signal is de-asserted to indicate that the power provided by the converter on the first or second channel is no longer good. Alternatively, in the event one of the output channels is disabled by a user while at least one other channel remains enabled, the disabled channel is ignored and the PGOOD signal stays asserted to indicate that the power provided by the converter on the enabled channel is good.

By monitoring enabled output channels of the switch mode power converter while ignoring channels that have been disabled by a user, the power condition of the converter can be reported via a single output and the number of output pins required on the converter IC package can be reduced, thereby reducing the overall cost of the converter. Moreover, by multiplexing the function of the delay counter among the multiple channels of the converter, the amount of circuit area required within the converter can be reduced, which further reduces the cost of the converter.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

An improved method of monitoring the output power generated by a switch mode power converter is provided that reduces the overall cost of the converter. The presently disclosed output power monitoring technique lowers the cost of the converter by allowing the circuit area within the converter to be reduced while reducing the number of output pins on the converter IC package.

Figure 1:
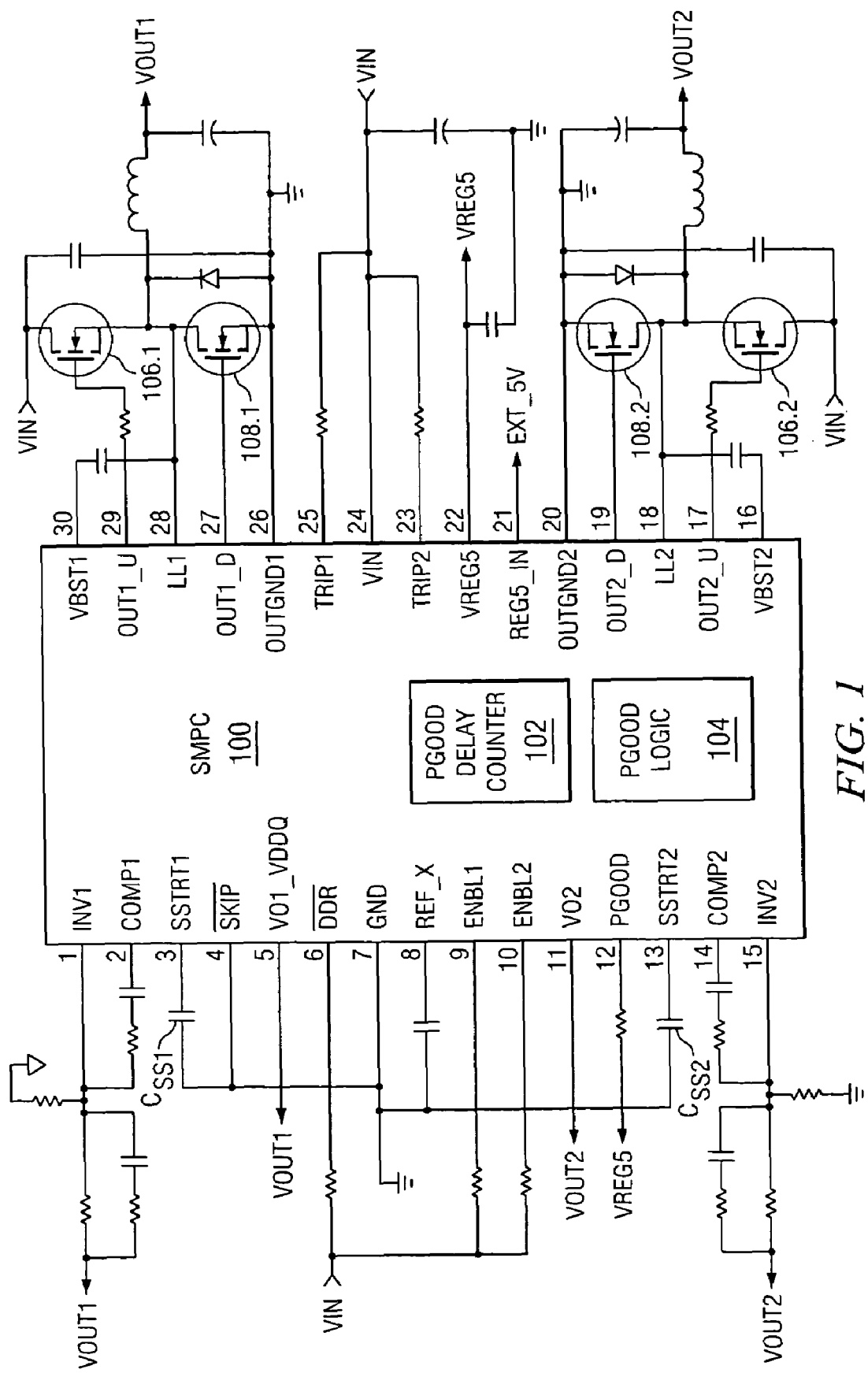
FIG. 1 is a schematic diagram of a typical application of a switch mode power converter according to the present invention.

FIG. 1 depicts an illustrative embodiment of an application of a Switch Mode Power Converter (SMPC) 100, in accordance with the present invention. As shown in FIG. 1, the SMPC 100 includes dual voltage inputs VIN, dual sets of voltage outputs VOUT1–VOUT2, a single Power-Good (PGOOD) signal output, and enable inputs ENBL1–ENBL2 for enabling dual output channels 1–2, respectively, within the SMPC 100. Further, the SMPC 100 includes a PGOOD delay counter 102 and PGOOD logic circuitry 104 for implementing a method of monitoring the output power provided by the SMPC 100 on the channels 1–2.

In the illustrated embodiment, the SMPC 100 is configured to decrease the voltage input levels VIN provided to the converter, i.e., the SMPC 100 is a step-down controller. The SMPC 100 is further configured to provide the stepped-down voltages to outputs OUT1_U–OUT2_U and OUT1_D–OUT2_D, which drive high-side n-channel MOSFETs 106.1–106.2 and low-side n-channel MOSFETs 108.1–108.2, respectively, to produce the output voltages VOUT1–VOUT2. The voltage input levels VIN are relatively high voltage levels and are typically provided by a battery (not shown). In the presently disclosed embodiment, the voltage inputs VIN are coupled to voltage regulator circuitry (not shown) and over-current comparator circuitry (not shown) within the converter. The enable inputs ENBL1–ENBL2 are asserted to enable the operation of the respective output channels 1–2. It is noted that the channels 1–2 may be manually enabled/disabled independent of the other channel by a user of the SMPC 100. In the preferred embodiment, the single PGOOD output is an open drain pull-down pin for the PGOOD signal.

It is noted that details of the structure and operation of the illustrative switch mode power converter 100 of FIG. 1 are described in the data sheet Dual, Voltage Mode, DDR Selectable, Synchronous, Step-Down Controller for Notebook System Power, TPS51020, Texas Instruments® Incorporated, SLUS564A—July 2003—revised November 2003, pages 1–24, which is incorporated herein by reference. It is appreciated, however, that the presently disclosed output power monitoring technique may be employed with any suitable type of power converter having any suitable number of output channels.

Figure 2:
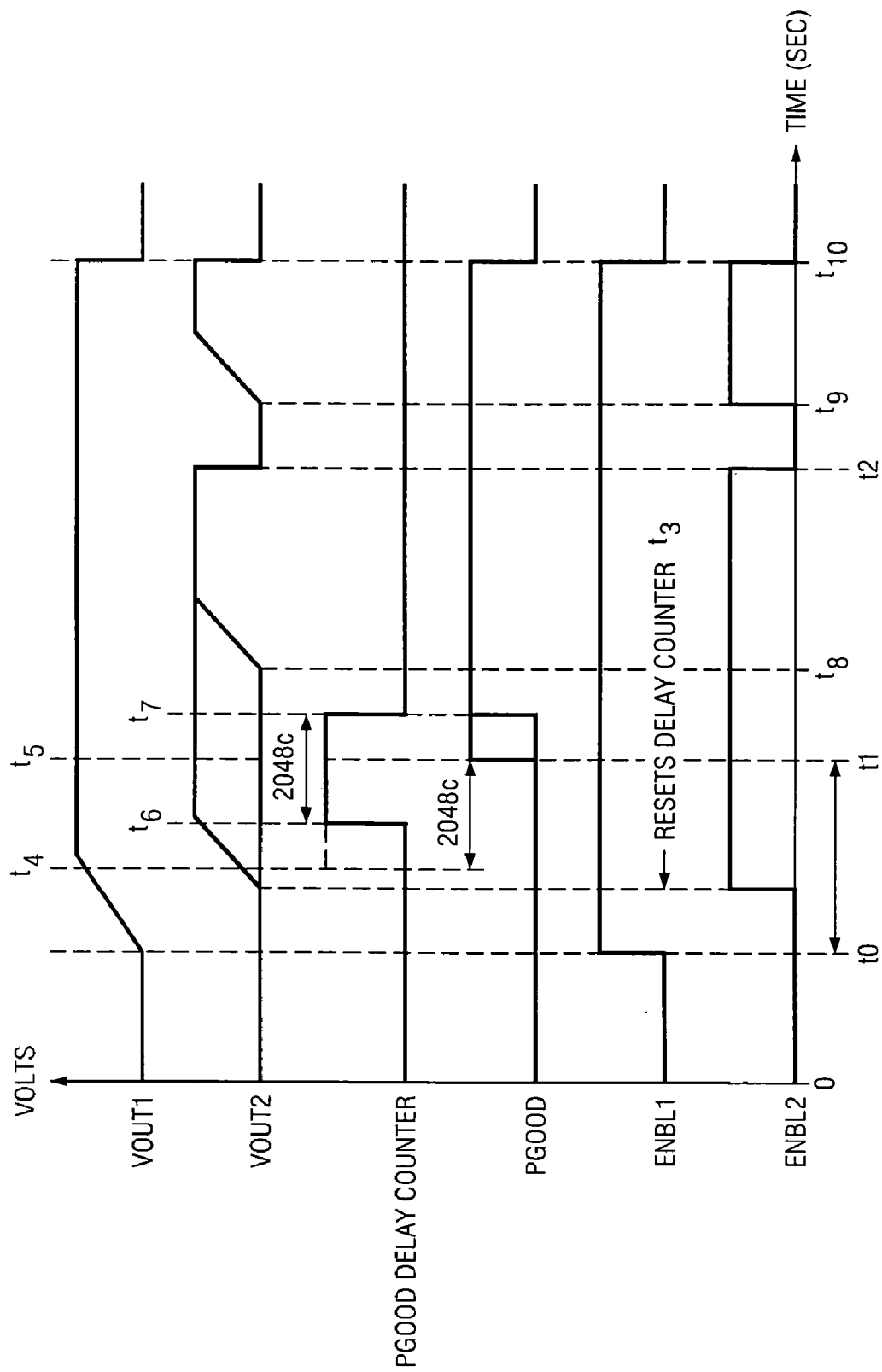
FIG. 2 is a timing diagram illustrating Power-Good and associated signals generated by the switch mode power converter of FIG. 1.

FIG. 2 is a timing diagram depicting the voltage output signals VOUT1–VOUT2, the PGOOD output signal, and the enable input signals ENBL1–ENBL2 of the switch mode power converter 100 (see FIG. 1). The timing diagram of FIG. 2 also depicts a signal corresponding to the PGOOD delay counter 102 that represents time intervals during which the delay counter 102 is actively counting.

It should be understood that the presently disclosed switch mode power converter includes soft-start circuitry (not shown) configured to limit in-rush currents at start-up. For example, an excessive in-rush current can cause an output voltage overshoot, which can disrupt the operation of a system processor by triggering unwanted resets. Further, excessive in-rush currents can increase the maximum current through converter components and require the use of components with increased maximum current ratings, significantly increasing the overall cost of the converter. The soft-start circuitry executes a soft-start procedure that feeds a constant current to external capacitors $C_{SS1}$–$C_{SS2}$ (see FIG. 1) to charge the capacitors, thereby ramping supply and reference voltages within the converter and limiting in-rush currents. The soft-start procedure is finished when the voltage across the capacitor $C_{SS1}$ or $C_{SS2}$ exceeds a predetermined threshold voltage.

Specifically, the timing diagram of FIG. 2 depicts the ramping of the output signal VOUT1 between times t0 and t4, during which the output channel 1 executes its soft-start procedure. Similarly, the ramping of the output signal VOUT2 is depicted between times t3 and t6, during which the output channel 2 executes its soft-start procedure. It is noted that the timing diagram of FIG. 2 also depicts the output signal VOUT2 initiating its soft-start procedure at times t8 and t9.

It should further be understood that the switch mode power converter is configured to generate the PGOOD signal to report whether power corresponding to the output channel 1 and/or the output channel 2 is "good", i.e., within a predetermined acceptable range. For example, if power levels generated by the converter fall outside the acceptable range, nonvolatile memory may be corrupted due to a supply voltage being too low relative to a minimum threshold voltage. Further, a processor powered by the converter may behave erratically due to unacceptable fluctuations in the supply voltage. In the presently disclosed embodiment, in the event the output voltage level VOUT1 and/or VOUT2 is below a predetermined upper limit (e.g., about 110% of a required output voltage level) and above a predetermined lower limit (e.g., about 90% of the required output voltage level), the PGOOD signal is asserted "high" by the converter, indicating that the power provided on the output channels 1 and/or 2 is good. Further, in the event the output voltage level VOUT1 and/or VOUT2 falls outside the predetermined voltage range, the PGOOD signal is asserted "low" by the converter, indicating that the power provided on the output channels 1 and/or 2 is no longer good.

Accordingly, by monitoring the state of the PGOOD signal generated by the switch mode power converter, the user can readily determine whether the output voltage levels VOUT1 and/or VOUT2 fall within a predetermined acceptable range. It should be understood, however, that the SMPC 100 may monitor output current information instead of or in addition to the output voltage information, and that the converter may employ the PGOOD signal to report the power condition of the converter based at least in part on the output current information.

In the preferred embodiment, the switch mode power converter is provided with input under-voltage lockout (UVLO) protection, output under-voltage protection, and over-voltage protection, the details of which are described in the above-referenced TPS51020 data sheet. With respect to the input under-voltage lockout protection, the converter includes an UVLO circuit (not shown) for monitoring the output of a voltage regulator (e.g., a 5 volt linear regulator), which serves as the bias for the low voltage circuitry within the converter and the DC boost voltage for the MOSFET gate drivers. The UVLO circuit monitors this voltage regulator output to protect circuitry within the converter from low input voltages. It is noted that the UVLO circuit also provides input under-voltage lockout protection for the input voltage VIN. If a trip threshold voltage is triggered for either the linear regulator or the input voltage VIN, the converter resets, waits for the low voltage to rise up over the threshold voltage, and re-start the part.

Figure 3:
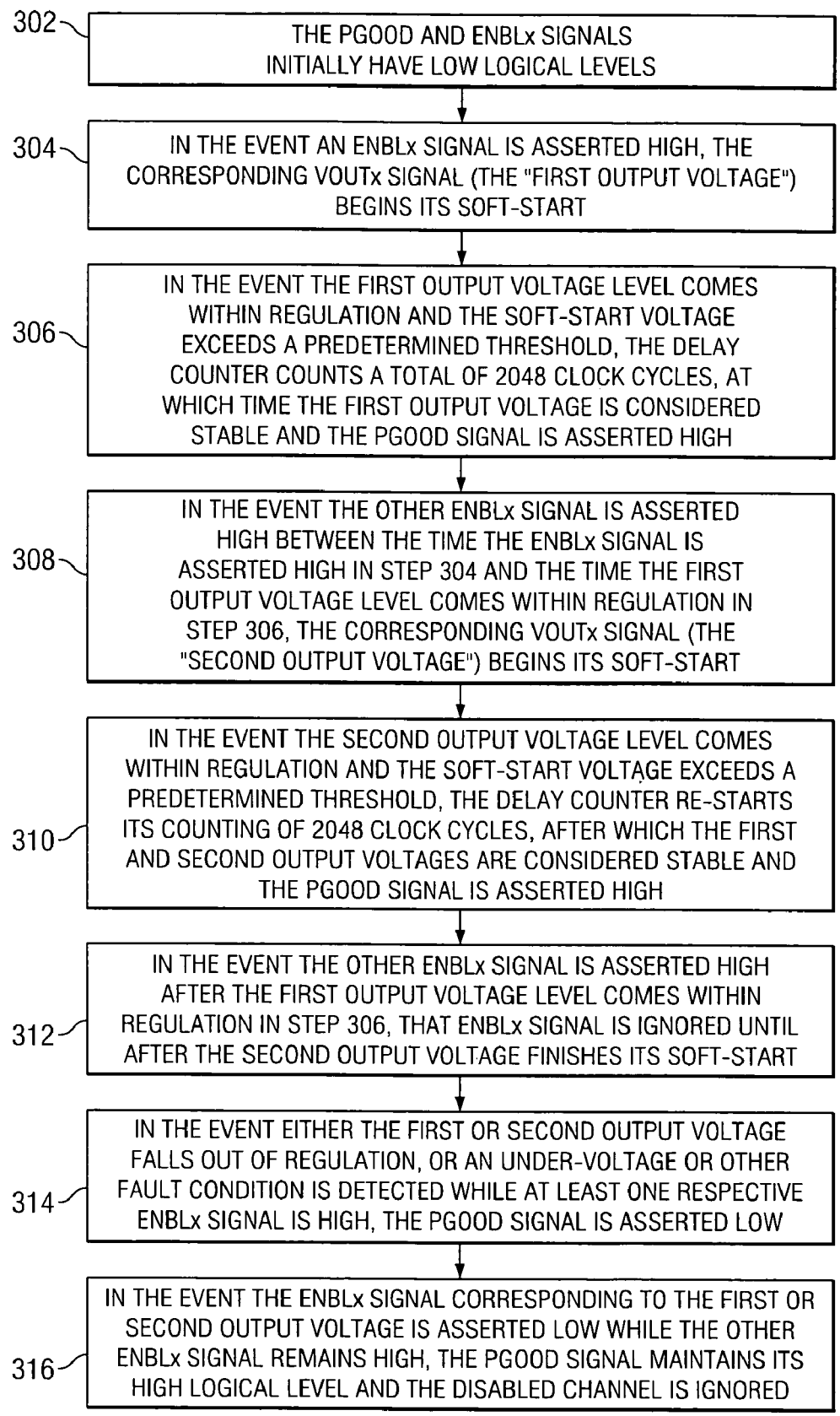
FIG. 3 is a flow diagram illustrating a method of monitoring the output power provided by the switch mode power converter of FIG. 1.

A method of monitoring the output power provided by the switch mode power converter of FIG. 1 is illustrated by reference to FIGS. 2–3. It is appreciated that the PGOOD delay counter and the PGOOD logic circuitry included in the converter are configured for performing the output power monitoring method. As depicted in step 302 of FIG. 3, the single PGOOD signal and the enable input signals ENBL1–ENBL2 initially have low logical levels (from 0 seconds to time t0; see FIG. 2). As depicted in step 304, in the event the enable input signal ENBL1 is asserted high (at time t0; see FIG. 2) to enable the first output voltage channel, a soft-start procedure for the first output voltage VOUT1 begins (at time t0). As depicted in step 306, in the event the first output voltage level comes within regulation (e.g., about ±10% of the required output voltage level) and the soft-start voltage of the first output channel is greater than a predetermined threshold voltage, the PGOOD delay counter starts counting (at time t4; see FIG. 2) a predetermined number of clock cycles (e.g., 2048 clock cycles). After the delay counter has counted the predetermined number of clock cycles, the first output voltage level VOUT1 is considered stable and the PGOOD signal is asserted high (at time t1; see FIG. 2), thereby indicating that the power provided on the first output channel is good. Alternatively, as depicted in step 308, in the event the enable input signal ENBL2 is asserted high (at time t3; see FIG. 2) between times t0–t1 to enable the second output voltage channel, a soft-start procedure for the second output voltage VOUT2 begins (at time t3). As depicted in step 310, in the event the second output voltage level comes within regulation (e.g., about ±10% of the required output voltage level) and the soft-start voltage of the second output channel is greater than the predetermined threshold voltage, the delay counter re-starts its counting (at time t6; see FIG. 2) of the 2048 clock cycles. After the delay counter has counted the 2048 clock cycles, the first and second output voltage levels VOUT1–VOUT2 are considered stable and the PGOOD signal is asserted high (at time t7; see FIG. 2), thereby indicating that the power provided on the first and second output channels is good. Alternatively, as depicted in step 312, in the event the enable input signal ENBL2 is asserted high (at times t8 and t9; see FIG. 2) to enable the second output voltage channel after the first output voltage level VOUT1 comes within regulation, the enabling of the second channel is ignored until after the second voltage output VOUT2 finishes its soft-start procedure. As depicted in step 314, in the event either the first or second output voltage VOUT1–VOUT2 falls out of regulation, or in the event an input under-voltage lockout condition is detected while at least one output channel is enabled, the PGOOD signal is asserted low, thereby indicating that the power provided on the first or second output channel is no longer good. Alternatively, as depicted in step 316, in the event one of the enable input signals ENBL1–ENBL2 is asserted low (e.g., see the input signal ENBL2 at time t2 in FIG. 2) to disable the corresponding output channel while the other enable input signal(s) remain high, the disabled channel is ignored and the PGOOD signal maintains its high logical level to indicate that the power provided by the converter on the enabled channel(s) is good. For example, the output channel may have been disabled by a user of the system.

Having described the above illustrative embodiments, other alternative embodiments or variations may be made. For example, it was described that the PGOOD signal may be de-asserted (i.e., the PGOOD signal may be asserted low) when one of the output voltages falls out of regulation to indicate that the power provided on that channel is no longer good. The PGOOD signal may also be de-asserted when an input under-voltage lockout condition or any other suitable fault condition occurs. Accordingly, by monitoring the PGOOD signal output, a user can determine the presence of either an unacceptable power condition or a fault condition in the switch mode power converter.

In addition, it was described that the PGOOD signal is asserted high or low based on the output voltage levels VOUT1–VOUT2. In an alternative embodiment, the PGOOD signal may be asserted based on levels of feedback voltages applied to inputs INV1–INV2 (see FIG. 1) of the switch mode power converter. The output voltage may therefore be monitored directly via the voltage outputs VOUT1–VOUT2, or indirectly via the feedback inputs INV1–INV2. Monitoring the feedback voltage levels at the inputs INV1–INV2 is useful in applications where the output voltage is adjusted, e.g., by a resistor divider. It is noted that there may be one or more frequency dependent elements in the feedback paths between the voltage outputs VOUT1 and VOUT2 and the feedback inputs INV1 and INV2, respectively. Such frequency dependent elements can extend the time required for the output voltage to achieve an acceptable voltage level. For this reason, the PGOOD delay counter is preferably not started until after the output voltage level is within regulation and the soft-start procedure is finished, thereby providing sufficient time for the output voltage level to come within the acceptable output voltage range.

Significant advantages are obtained from the presently disclosed method of monitoring the output power provided by a switch mode power converter. For example, there are multiple channel enable pins on the IC package of the converter, and the PGOOD output signal ignores channels that have been disabled manually by a user. If the user enables and disables channels via the enable pins, then he or she already knows that the power on the disabled channel(s) is not good. The user therefore does not need the power condition of the disabled channel(s) reported to him or her via the PGOOD output. If the power provided on the enabled channel(s) is good, then the PGOOD output maintains its logical state indicating that the power level on the enabled channel(s) is within the acceptable range. In this way, the power condition of multiple converter channels can be monitored using the single PGOOD output signal. Moreover, the multiplexing of the function of the PGOOD delay counter for the multiple output channels saves circuit area within the converter and reduces costs.

It will be appreciated by those of ordinary skill in the art that modifications to and variations of the above-described advanced monitoring algorithm for regulated power systems with single output flag may be made without departing from the inventive concepts disclosed herein. Accordingly, the invention should not be viewed as limited except as by the scope and spirit of the appended claims.

What is claimed is:

1. A method of monitoring power provided on multiple output channels of a switch mode power supply, comprising the steps of:

enabling at least one first output channel to provide a first signal representative of a first output;

when the level of the first signal is within a predetermined range of output levels, initiating a first time delay;

enabling at least one second output channel to provide a second signal representative of a second output;

in the event the second channel is enabled before the expiration of the first time delay, initiating a second time delay when the level of the second signal is within the predetermined range of output levels, and asserting a single status signal when the second time delay expires to indicate that the power provided on the first and second channels is good; and in the event at least one of the first and second signal levels is no longer within the predetermined range of output levels, de-asserting the single status signal to indicate that the power provided on at least one of the channels is no longer good.

2. The method of claim 1 further including the steps of disabling at least one of the output channels by a user of the switch mode power supply, and in the event at least one of the output channels remains enabled, ignoring the disabled output channel and asserting the single status signal to indicate that the power provided on the enabled output channel is good.

3. The method of claim 1 further including the step of detecting at least one fault condition while at least one of the output channels is enabled and de-asserting the single status signal to indicate the presence of the fault condition.

4. The method of claim 3 wherein the fault condition comprises an input under-voltage lock-out condition.

5. The method of claim 1 further including the step of initiating a first soft-start procedure on the first output channel after the first channel is enabled.

6. The method of claim 1 further including the step of asserting the single status signal when the first time delay expires to indicate that the power provided on the first channel is good.

7. The method of claim 1 further including the step of initiating a second soft-start procedure on the second output channel after the second channel is enabled.

8. The method of claim 7 further including the step of, in the event the second channel is enabled after the expiration of the first time delay, ignoring the second channel until after the second soft-start procedure finishes and asserting the single status signal to indicate that the power provided on at least the first channel is good.

* * * * *